United States Patent Office 3,445,491
Patented May 20, 1969

3,445,491
PERFLUOROALKYLAMIDO - ALKYLTHIO METHACRYLATES AND ACRYLATES AND INTERMEDIATES THEREFOR
Pier Luigi Pacini, Bronxville, N.Y., assignor to Geigy Chemical Corporation, Ardsley, N.Y., a corporation of New York
No Drawing. Filed June 30, 1967, Ser. No. 650,239
Int. Cl. C08h 9/02; C08f 3/84; B44d 1/32
U.S. Cl. 260—399                                      13 Claims

ABSTRACT OF THE DISCLOSURE

Perfluoroalkylamido-alkylthio methacrylates and acrylates are monomers which can readily be polymerized to corresponding polymers which are useful for imparting soil, water, and oil repellency properties to textile fabrics. A particularly preferred example is 2(n-perfluorooctanoamido)ethyl thiomethacrylate. Polymers of the monomers disclosed include homopolymers, copolymers and blends with other polymers useful in fabric finishes. Mercaptans useful as intermediates for these monomers are also disclosed.

This invention relates to novel monomers useful for the preparation of certain polymers with oil and water repellent properties useful in treating materials such as textiles, paper, leather, painted wooden and metallic surfaces, and the like.

The compounds of the present invention are of the following formula:

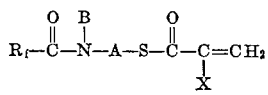

wherein $R_f$ is a perfluorinated alkyl of straight or branched chain of 2 to 18 carbon atoms; preferably 6 to 10 carbon atoms; A is alkylene of 2 to 6 carbon atoms, preferably 2; B is hydrogen or a straight or branched chain alkyl of 1 to 4 carbon atoms and preferably hydrogen or methyl; X is hydrogen or methyl.

Thus this invention relates to monomers of perfluoroalkylamido-alkylthio esters of acrylic and methacrylic acids.

This invention also relates to certain novel intermediates for making the new monomers.

The foregoing monomer compounds may be readily polymerized by procedures familiar to those skilled in the art to polymers with excellent oil, water, and soil repellency. Both homopolymers, and copolymers with other alkylenically unsaturated compounds are contemplated. Where possible, emulsion polymerization in an aqueous medium is preferred.

The compounds of the present invention can be prepared readily according to the following reaction sequences:

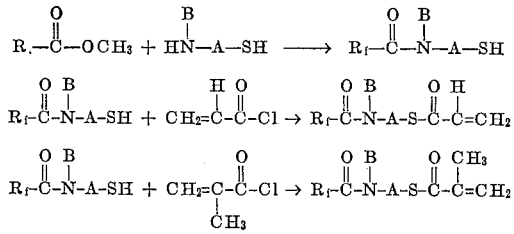

The starting materials are generally readily available or can easily be prepared by procedures apparent to those skilled in the art.

It is to be understood that the perfluoroalkyl group may be of varying chain length since basic starting materials are often obtained by telomerization procedures yielding $R_f$ groups of varying length.

Because of the especially desirable soil repellent properties of polymers made therefrom, a particularly preferred monomer compound within the scope of this invention is 2(n-perfluorooctanoamido)ethyl thiomethacrylate.

Homopolymers and copolymers of the instant monomers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the instant monomers may vary from 1 to 99% by weight of the total monomer mixture. It is preferred however, for the best balance of economy and ultimate properties, to use between about 40 and about 90% by weight of the instant monomers based on the total monomer mixture.

It is also advantageous, especially in the preparation of fabric finishes, to use blends of homopolymers of the instant perfluoroalkyl monomers with other homopolymers such as alkyl acrylates and alkyl methacrylates. For example, from about 20 to about 97% by weight of a homopolymer such as poly n-octyl methacrylate provides useful compositions which, surprisingly, retain high repellency ratings even though the relative amount of the polymer of the instant monomers may be quite low. Such blends substantially reduce the cost of obtaining an effective fabric finish.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in any way limit the scope of the invention defined in the claims.

Example 1.—2-(n-perfluorooctanoamido)ethyl thiomethacrylate (A) 2(n - perfluorooctanoamido)ethyl mercaptan. — Methyl perfluorooctanoate (23.54 g., 0.055 mole) is added dropwise to a stirred solution of mercaptoethylamine (8.6 g., 0.11 mole) in 50 ml. of methanol. The mixture is stirred for seven minutes and then poured in 200 ml. of water. The solid product is filtered and crystallized from Freon 113 to yield 19.2 g. of 2(n-perfluorooctanoamido) ethyl mercaptan, M.P. 85–87° C.

The infrared spectrum shows the amide carbonyl absorption at 1720 μ-1 and the NH at 3350 μ-1. The NMR spectrum in CD$_2$COCD$_3$ (vs. tetramethylsilane) shows a quartet at δ 2.8 (S-methylene), a quartet at δ 3.6 (N-methylene) and a broad singlet at δ 8.5 (NH and SH).

*Analysis.*—Calcd. for C$_{10}$H$_6$F$_{15}$NOS: C, 25.37; H, 1,27; F, 60.22; N, 2.81; S, 6.77. Found: C, 25.09; H, 1.57; F, 61.47; N, 3.24; S, 6.83.

(B) 2 - (n-perfluorooctanoamido)ethyl thiomethacrylate.—A mixture of 2-(n-perfluorooctanoamido)ethyl mercaptan (0.053 mole) and methacrylic chloride (0.053 mole) in 170 ml. of spectrograde methylene chloride is cooled to −15° C. A solution of pyridine (0.055 mole) in 50 ml. of methylene chloride is next added dropwise at such a rate that the temperature of the reaction mixture never rises above −10° C., a trace of iodine being added as a polymerization inhibitor. The reaction is carried out under nitrogen. After the addition is completed, the mixture is allowed to warm slowly to 10° C. and then filtered. Volatile material is removed from the filtrate by distillation under reduced pressure and the residue is extracted several times with hot petroleum ether. The petroleum ether extracts are placed in a refrigerator and the 2(n-perfluorooctanoamido)ethyl thiomethacrylate precipitate is filtered and dried. The yield is 11.8 g., M.P. 53.5–56° C.

The solid residue from the petroleum ether extraction is treated with water and extracted with chloroform. The chloroform layer separates, and the solvents are removed by vacuum distillation and the residue crystallized from petroleum ether. An additional 5.2 g. of product is obtained.

The NMR spectrum in CD$_2$COCD$_3$ (vs. tetramethylsilane) shows a doublet at 1.99δ (CH$_3$), a multiplet at 3.2δ (S-methylene), a quartet at 3.6δ (N-methylene), a quartet at 5.69δ (vinyl cis to methyl) a quartet at 6.12δ (vinyl trans to methyl) and a broad singlet at 7.2δ for the NH proton. Analysis shows 2.81% of N (2.58 calculated).

Example 2.—2(pentafluoropropionamido)ethyl thiomethacrylate (A) 2(pentafluoropropionamido)ethyl mercaptan. — This compound is prepared from the ethyl pentafluoropropionate and mercaptoethylamine by a procedure analogous to that of Example 1. In the present procedure, the liquid product is extracted from the water solution with chloroform and purified by distillation under reduced pressure. The yield of the distilled product is 80%; B.P. 103° C. at 15 mm. of pressure.

(B) 2(pentafluoropropionamido)ethyl thiomethacrylate.—2(pentafluoropropionamido)ethyl mercaptan, methacrylic chloride and pyridine are reacted according to the procedure of Example 1 except that the reaction mixture is worked up by pouring it in water and extracting the liquid product with chloroform. Distillation of the crude product gives 2(pentafluoropropionamido)ethyl thiomethacrylate in 57% yield; B.P. 93° C. at 0.015 mm. of pressure.

Example 3.—2(n-heptafluorobutyroamido)ethyl thiomethacrylate (A) 2(n-heptabutyroamido)ethyl mercaptan. — This compound is prepared from methyl heptafluorobutyrate and mercaptoethylamine using the same procedure as in Examples 1 and 2. Yield 63%; B.P. 105° C. at 13 mm. of pressure.

(B) 2(n-heptafluorobutyroamido)ethyl thiomethacrylate.—2(n-heptabutyroamido)ethyl mercaptan, methacrylate chloride and pyridine are reacted according to the procedure of Examples 1 and 2. The yield of distilled product was 49%; B.P. 99° C. at 0.02 mm. of pressure.

Example 4

The procedure of the foregoing examples is repeated employing stoichiometrically equivalent amounts of corresponding starting materials. The following compounds are thus obtained:

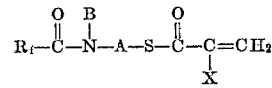

| R$_f$ | B | A | X |
|---|---|---|---|
| CF$_3$ | H | (CH$_2$)$_6$ | CH$_3$ |
| (CF$_3$)$_2$CF | CH$_3$ | (CH$_2$)$_3$ | H |
| CF$_3$(CF$_2$)$_6$ | CH$_2$(CH$_2$)$_3$ | (CH$_2$)$_2$ | CH$_3$ |
| CF$_3$(CF$_2$)$_{17}$ | H | (CH$_2$)$_2$ | CH$_3$ |
| CF$_3$(CF$_2$)$_{11}$ | H | (CH$_2$)$_2$ | CH$_3$ |
| CF$_3$(CF$_2$)$_{10}$ | H | (CH$_2$)$_4$ | H |
| CF$_3$(CF$_2$)$_{10}$ | CH$_3$ | (CH$_2$)$_2$ | H |
| CF$_3$(CF$_2$)$_6$ | CH$_3$CH$_2$ | (CH$_2$)$_2$ | H |
| (CF$_3$)$_2$CF(CF$_2$)$_6$ | H | (CH$_2$)$_2$ | CH$_3$ |
| (CF$_3$)$_2$CF[CF$_2$CF(CF$_3$)]$_4$ | H | (CH$_2$)$_2$ | H |
| CF$_3$[CF$_2$CF(CF$_3$)]$_5$ | H | (CH$_2$)$_2$ | CH$_3$ |

While the invention has been explained by detailed description of certain specific embodiments, it is understood that various modifications and substitutions can be made in any of them within the scope of the appended claims which are intended also to include equivalents of such embodiments.

What is claimed is:

1. A compound of the formula:

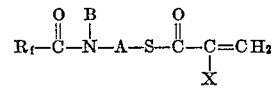

wherein
R$_f$ is a perfluorinated alkyl of straight or branched chain of 2 to 18 carbon atoms;
A is alkylene of 2 to 6 carbon atoms;
B is hydrogen or alkyl of 1 to 4 carbon atoms; and
X is hydrogen or methyl.

2. A compound as claimed in claim 1 wherein X is hydrogen.

3. A compound as claimed in claim 1 wherein X is methyl.

4. A compound as claimed in claim 1 wherein R$_f$ is a perfluorinated alkyl of 6 to 10 carbon atoms.

5. A compound as claimed in claim 1 wherein B is hydrogen.

6. A compound as claimed in claim 1 wherein A is ethylene.

7. A compound as claimed in claim 1 which is 2(n-perfluorooctanoamido)ethyl thiomethacrylate.

8. A compound as claimed in claim 1 which is 2(pentafluoropropionamide)ethyl thiomethacrylate.

9. A compound as claimed in claim 1 which is 2(n-heptafluorobutyroamido)ethyl thiomethacrylate.

10. A compound of the formula:

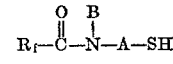

wherein
R$_f$ is a perfluorinated alkyl of straight or branched chain of 2 to 18 carbon atoms;
A is alkylene of 2 to 6 carbon atoms; and
B is hydrogen or alkyl of 1 to 4 carbon atoms.

11. A compound as claimed in claim 10 which is 2(n-perfluorooctanoamide)ethyl mercaptan.

12. A compound as claimed in claim 10 which is 2(pentafluoropropionamido)ethyl mercaptan.

13. A compound as claimed in claim 10 which is 2(n-heptabutyramido)ethyl mercaptan.

No references cited.

DANIEL D. HORWITZ, *Primary Examiner.*

U.S. Cl. X.R.

117—127, 139.5, 142, 148, 155; 252—8.57, 8.8; 260—79.7, 455, 561